United States Patent Office 3,020,141
Patented Feb. 6, 1962

3,020,141
MIXED ANHYDRIDES OF PHOSPHORODIAMIDIC
ACID IN METHOD OF WEED CONTROL
Philip C. Hamm, Webster Groves, Mo., and George A. Saul, Nitro, W. Va., assignors to Monsanto Chemical Company, St. Louis, Mo., a corporation of Delaware
No Drawing. Filed Mar. 3, 1958, Ser. No. 718,493
12 Claims. (Cl. 71—2.3)

This invention relates to controlling vegetation with mixed anhydrides of monohalogen substituted acetic acids and phosphorodiamidic acids, to herbicidal compositions containing these mixed anhydrides as an essential ingredient and to methods of applying such compositions for destroying or controlling vegetation.

An object of the invention is to destroy or control weeds and other undesired vegetation. Another object is to provide herbicidal compositions which destroy or control grasses. A particular object of the invention is to provide herbicidal compositions which destroy or control grasses in pre-emergence application. Another object of the invention is to provide herbicidal compositions which are effective against broadleaf plants. Further objects will be apparent from the detailed description following.

The compositions of the present invention contain as their essential active ingredient a mixed anhydride having the general formula

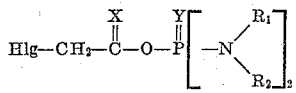

where Hlg represents chlorine, bromine, or iodine, chlorine being preferred because of greater availability and more economical preparation, X and Y represent oxygen or sulfur and may be different but Y is preferably oxygen, and $R_1$ and $R_2$ which may be the same or different represent alkyl or alkenyl radicals, preferably containing more than one but less than six carbon atoms, alkoxyalkyl, alkenoxyalkyl or divalent radicals which together with the nitrogen form a heterocyclic ring, as for example pyrrolidine, morpholine and piperidine. In addition, either $R_1$ or $R_2$ but not both may be aryl. Typical examples of $R_1$ and $R_2$ comprise methyl, ethyl, propyl, isopropyl, butyl, isobutyl, sec-butyl, amyl, sec-amyl, allyl, methallyl, 2-butenyl, phenyl, methoxyethyl, methoxypropyl, ethoxypropyl, ethoxyethyl, vinyloxyethyl and vinyloxypropyl radicals, and divalent radicals containing four to nine carbon atoms. The evidence indicates that compounds in which $R_1$ and $R_2$ contain two or three carbon atoms are active at lower dosages than compounds in which $R_1$ and $R_2$ are methyl radicals. There is a possibility of thermal rearrangement in the case of phosphorothionates resulting in anhydrides of the phosphorothiolic acids. If this takes place in any of the instances described it is evident that such compounds are also suitable.

Many of this class are new compounds. They may be prepared by condensing an ester of a phosphorodiamidic acid and a halogen substituted acetyl halide. Phosphorodiamidic acid is used in a generic sense to include phosphorodiamidothioic acids. No solvent is necessary although use of one is not precluded. The reactants are heated until the theoretical amount of by-product halide is evolved and the product purified by distillation or, where applicable, by recrystallization or other means, but it is generally satisfactory for use directly as a herbicide.

Suitable examples of haloacetyl halides include monochloracetyl chloride, bromacetyl chloride, iodoacetyl chloride, monochloracetyl bromide, monochloracetyl fluoride, monochloracetyl iodide and monochlorothioacetyl chloride.

Typical phosphorodiamidates comprise ethyl tetraallylphosphorodiamidate, methyl tetramethylphosphorodiamidothionate, methyl tetraethylphosphorodiamidothionate, ethyl tetraethylphosphorodiamidate, ethyl tetrapropylphosphorodiamidate, ethyl tetraisopropylphosphorodiamidate and ethyl tetrabutylphosphorodiamidate.

The following examples illustrate the preparation of the new herbicides in detail:

EXAMPLE 1

To 108.0 grams (0.6 mole) of ethyltetramethylphosphorodiamidate at 60° C. was added 56.5 grams (0.5 mole) of chloracetyl chloride, causing the temperature to rise to 105° C. in seven minutes. The mixture was then cooled to 70° C. by means of an ice bath. Over a period of ten minutes the temperature was then brought back to 100° C. and held there for about five hours or until the theoretical quantity of ethyl chloride was evolved. The final weight loss was 34 grams (theory= 32.25 grams). After filtration through paper the mixed anhydride of tetramethylphosphorodiamidic acid and chloracetic acid was obtained as a mobile dark red liquid. Analysis gave 14.3% phosphorus, 12.4% nitrogen and 13.6% chlorine as compared to 14.1% phosphorus, 12.7% nitrogen and 13.4% chlorine calculated for $C_6H_{14}ClN_2O_3P$.

EXAMPLE 2

To 54.3 grams (0.191 mole) of ethyl tetraallylphosphorodiamidate maintained at 27° C. was added 19.2 grams (0.17 mole) of chloracetyl chloride. The temperature rose rapidly to 35° C. and was reduced to 30° C. by means of an ice bath. When no further heat evolution was apparent, the mixture was heated gradually to 93° C. over the next 90 minutes and then maintained at 94–95° C. for an additional 16 hours. The weight loss was 10.2 grams. The mixed anhydride of chloracetic acid and tetraallylphosphorodiamidic acid so obtained was a brown liquid. Analysis gave 10.9% chlorine, 10.6% phosphorus and 8.0% nitrogen as compared to 10.7% chlorine, 9.3% phosphorus and 8.4% nitrogen calculated for $C_{14}H_{22}ClN_2O_3P$.

EXAMPLE 3

(a) To 54.3 grams (0.230 mole) of ethyl tetraethylphosphorodiamidate maintained at 18° C. was added 22.6 grams (0.2 mole) of chloracetyl chloride. The temperature during the addition was held at 15–20° C. by means of an ice-bath. The mixture was then heated to and maintained at 110° C. for 1 hour, 100 mm. of mercury vacuum applied and heating continued at 100° C. for ½ hour. The weight loss was 12.0 grams during vacuum treatment (theory=12.9 grams). The mixed anhydride of chloracetic acid and tetraethylphosphorodiamidic acid was obtained as a dark brown liquid soluble in all common organic solvents. Analysis gave 9.9% phosphorus, 13.1% chlorine and 9.5% nitrogen as compared to 10.9% phosphorus, 12.5% chlorine and 9.8% nitrogen calculated for $C_{10}H_{22}ClN_2O_3P$.

(b) The mixed anhydride of chloracetic acid and tetraisopropylphosphorodiamidic acid prepared as above was obtained as a dark brown liquid in approximately 73.5% yield.

EXAMPLE 4

To 87.6 grams (0.299 mole) of ethyl tetrapropylphosphorodiamidate maintained at 18° C. was added over a period of 12 minutes 30.5 grams (0.270 mole) of chloracetyl chloride. The temperature during the addition was held at 15–20° C. by means of an ice-bath. When addition was complete, the reaction mixture was maintained at 110° C. for an hour and then 20 mm. mercury vacuum applied, after which the temperature was brought to 120° C. and held there for a half hour. The mixed anhydride of chloracetic acid and tetrapropylphosphorodiamidic acid was obtained as a dark amber liquid in theoretical yield. Analysis gave 10.5% phosphorus, 10.4% chlorine and 8.2% nitrogen as compared to 9.1% phosphorus, 10.4% chlorine and 8.2% nitrogen calculated for $C_{14}H_{30}ClN_2O_3P$.

EXAMPLE 5

To 25 grams (0.099 mole) of ethyl tetraethyl phosphorodiamidothionate was added at room temperature 11.3 grams (0.099 mole) of chloracetyl chloride. The product was maintained at a temperature of 90–100° C. for an hour and then stripped to 100° C. under a pressure of 5 mm. The mixed anhydride of chloracetic acid and tetraethylphosphorodiamidothionic acid so obtained was a dark brown-black liquid. The yield was 92.5% of theory. Analysis gave 10.5% phosphorus, 9.2% sulfur and 9.5% nitrogen as compared to 10.3% phosphorus, 10.6% sulfur and 9.3% nitrogen calculated for $C_{10}H_{22}ClN_2O_2PS$.

Further examples of herbicides which may be prepared in similar manner are hereinafter disclosed.

A method of destroying or controlling undesired vegetation, according to this invention, comprises applying thereto a toxic concentration of the above-defined mixed anhydrides. By applying the toxicants to vegetation is meant any means whereby the toxicant is brought into contact with living plants. The toxicants may be applied conveniently in the form of a spray containing the active ingredient in a concentration within the range of 0.1%–10.0% by weight. Thorough coverage of the foliage is effective for contact killing. For pre-emergence control of grasses amounts within the range of ½–60 pounds per acre have been used successfully. Examples of grasses which are controlled are foxtail, cheat grass, brome grass, wild oats and rye grass. Besides exerting highly efficient killing action on grasses (Gramineae) the new toxicants very effectively control pigweed (Amaranthacea) and members of the family Chenopodiaceae which represents a very prevalent weed family. Tolerance for corn and slight to moderate activity on cotton and radish point up the usefulness of these mixed anhydrides on agricultural crops.

In general, in the application of these compounds, aqueous dispersions or aqueous solutions depending on whether or not the compound is water soluble, will be found most desirable. The dispersions will of course contain a dispersing or wetting agent and the solutions also preferably contain wetting agents to facilitate the spreading of the solution. As dispersing and wetting agents there may be employed soft or hard sodium or potassium soaps, alkylated aromatic sodium sulfonates such as sodium dodecylbenzenesulfonate, or an amine salt of dodecylbenzenesulfonic acid, alkali metal salts of sulfated fatty alcohols, ethylene oxide condensation products of alkyl phenols or tall oil and other dispersing and wetting agents.

The tables below illustrate characteristic herbicidal activity of the mixed anhydrides of this invention. The toxicant was emulsified in water and the emulsion applied as a spray. In the pre-emergence tests the spray was applied to the ground of seeded plots before the grass or other plants emerged. The amount of the mixed anhydride applied in pounds per acre is recorded together with the phytotoxicity observed. In the foliage tests the spray containing the concentration of the active ingredient shown in the table was applied to the foliage of grass and to the foliage of bean plants and finally to the foliage of a mixture of broadleaved plants and the effect recorded. The following phytotoxicity rating key was used:

|  | Contact | Pre-Emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 | |
| Defoliation | B | |

The plants employed in the pre-emergence tests are designated by letter in Table I. The plants corresponding to the letters are as follows:

A.—Wild oat
B.—Brome grass
C.—Rye grass (domestic)
D.—Buckwheat
E.—Mustard (radish)
F.—Beet-sugar
G.—Cotton
H.—Corn
J.—Foxtail
K.—Barnyard grass
L.—Crab grass
M.—Pigweed

*Table I*

PRE-EMERGENCE

| Compound | Lbs./Acre | A | B | C | D | E | F | G | H | J | K | L | M |
|---|---|---|---|---|---|---|---|---|---|---|---|---|---|
| Product of Example 1 | 10 | 3 | 3 | 3 | 1 | 1 | 3 | 0 | 0 | 3 | 3 | 3 | 3 |
| Product of Example 2 | 5 | 3 | 3 | 3 | 0 | 2 | 0 | 0 | 1 | 3 | | | |
|  | 2.5 | 2 | 1 | 3 | 1 | 2 | 0 | 0 | 1 | 2 | | | |
| Product of Example 3(a) | 10 | 3 | 3 | 3 | 1 | 0 | 3 | 1 | 0 | 3 | 3 | 3 | 3 |
|  | 5 | 3 | 3 | 3 | 0 | 0 | 2 | 0 | 2 | 3 | 3 | 3 | 3 |
|  | 3 | 2 | 3 | 3 | 0 | 0 | 0 | 0 | 0 | 3 | 3 | 3 | 3 |
|  | 1 | 1 | 1 | 3 | 0 | 0 | 0 | 0 | 0 | 3 | 3 | 3 | 1 |
| Product of Example 4 | 10 | 3 | 3 | 3 | 0 | 1 | 3 | 0 | 1 | 3 | 3 | 3 | 3 |
|  | 5 | 3 | 3 | 3 | 0 | 1 | 3 | 0 | 0 | 3 | 3 | 3 | 3 |
|  | 2.5 | 1 | 3 | 3 | 1 | 1 | 1 | 0 | 0 | | | | |
| Product of Example 5 | 10 | 3 | 3 | 3 | 0 | 0 | 3 | 1 | 0 | 3 | 3 | 3 | 3 |
|  | 5 | 3 | 0 | 3 | 0 | 0 | 0 | 0 | 2 | 2 | | 3 | 3 |

*Table II*

CONTACT

| Active Ingredient | Conc., Percent | Grass | Bean | Broad-leaf |
|---|---|---|---|---|
| Product of Example 1 | 1.0 | 3 | 2 | 4 |
|  | 0.3 | 2 | 1 | 2 |
| Product of Example 2 | 0.2 | 2+ | 1 | 1+ |
|  | 0.05 | 2 | 1 | 1 |
| Product of Example 3(a) | 0.5 | 2 | | 1 |
| Product of Example 4 | 0.5 | 3 | 3 | 3+ |
| Product of Example 5 | 0.5 | 1+ | 0 | 2 |

Other examples of the new herbicides comprise the mixed anhydride of chloracetic acid and tetrabutylphosphorodiamidic acid, the mixed anhydride of bromacetic acid and tetraethylphosphorodiamidic acid, the mixed anhydride of chloracetic acid and tetrakis(methoxyethyl)phosphorodiamidic acid, the mixed anhydride of iodoacetic acid and tetraethylphosphorodiamidic acid and the mixed anhydride of iodoacetic acid and tetrapropylphosphorodiamidic acid.

It is intended to cover all changes and modifications of the examples of the invention herein chosen for purposes of disclosure which do not constitute departures from the spirit and scope of the invention.

The present application is a continuation-in-part of co-pending application Serial No. 491,190, filed February 28, 1955, now U.S. Patent 2,848,492, granted August 19, 1958.

What is claimed is:

1. The method of destroying and inhibiting vegetation which comprises applying thereto a toxic concentration of a mixed anhydride of chloroacetic acid and tetra (lower alkoxy substituted lower alkyl) phosphorodiamidic acid.

2. The method of claim 1 in which the toxicant is applied to the ground before the plants emerge.

3. The method of destroying vegetation which comprises applying thereto a toxic concentration of mixed anhydride of the structure

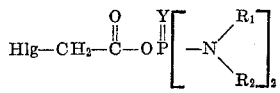

where Hlg represents halogen selected from the group consisting of chlorine, bromine and iodine, Y represents a member of the group consisting of oxygen and sulfur, $R_1$ and $R_2$ are selected from the group consisting of lower alkyl, lower alkenyl, lower alkoxy substituted lower alkyl, vinyloxy substituted lower alkyl and phenyl radicals with the proviso that not more than one is phenyl and $R_1$ and $R_2$ together with the nitrogen represent a radical selected from the group consisting of pyrrolidinyl, piperidinyl and morpholinyl.

4. The method of destroying and inhibiting vegetation which comprises applying thereto a toxic concentration of a mixed anhydride of the structure

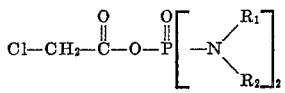

where $R_1$ and $R_2$ represent lower alkenyl groups.

5. The method of destroying and inhibiting vegetation which comprises applying thereto a toxic concentration of a mixed anhydride of the structure

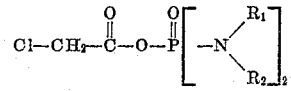

where $R_1$ and $R_2$ represent alkyl groups of less than four carbon atoms.

6. The method of destroying and inhibiting vegetation which comprises applying thereto a toxic concentration of the mixed anhydride of chloracetic acid and tetraethylphosphorodiamidic acid.

7. The method of destroying and inhibiting vegetation which comprises applying thereto a toxic concentration of the mixed anhydride of chloracetic acid and tetraallylphosphorodiamidic acid.

8. The method of destroying and inhibiting vegetation which comprises applying thereto a toxic concentration of the mixed anhydride of chloracetic acid and tetrapropylphosphorodiamidic acid.

9. The method of destroying and inhibiting vegetation which comprises applying thereto a toxic concentration of the mixed anhydride of chloracetic acid and tetramethylphosphorodiamidic acid.

10. The method of destroying and inhibiting vegetation which comprises applying thereto a toxic concentration of a mixed anhydride of the structure

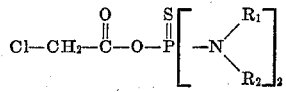

where $R_1$ and $R_2$ represent lower alkenyl groups.

11. The method of claim 4 in which the toxicant is applied to the ground before the plants emerge.

12. The method of claim 5 in which the toxicant is applied to the ground before the plants emerge.

References Cited in the file of this patent

UNITED STATES PATENTS 2,714,064    Morris et al. _____ July 26, 1955
2,848,492    Saul et al. _____ Aug. 19, 1958

OTHER REFERENCES

Schrader: U.S. Publication Board Report No. 87,923, April 1948, 63 pages (pages 22 and 33 especially of interest).